United States Patent [19]

Stayner

[11] 3,960,614

[45] June 1, 1976

[54] WAX-FLUX COMPOSITION CONTAINING A DIESTER OF SULFOMALEIC ACID FOR SOLDERING

[75] Inventor: Robert A. Stayner, Lafayette, Calif.

[73] Assignee: Chevron Research Company, San Francisco, Calif.

[22] Filed: Jan. 31, 1975

[21] Appl. No.: 545,943

[52] U.S. Cl. ................................. 148/23; 148/22
[51] Int. Cl.² ........................................ B23K 35/34
[58] Field of Search ............................. 148/22, 23

[56] References Cited
UNITED STATES PATENTS

| | | | |
|---|---|---|---|
| 2,664,370 | 12/1953 | Snell | 148/23 |
| 2,672,479 | 3/1954 | Doerr | 148/23 |
| 2,700,628 | 1/1955 | DeRosa | 148/23 |
| 2,898,255 | 8/1959 | Thompson | 148/23 |
| 3,459,606 | 8/1969 | Becker | 148/23 |
| 3,832,242 | 8/1974 | Cuthbert | 148/23 |

Primary Examiner—Peter D. Rosenberg
Attorney, Agent, or Firm—G. F. Magdeburger; C. J. Tonkin; J. T. Brooks

[57] ABSTRACT

Wax-flux compositions for use in low-temperature soldering processes comprise (A) a major amount of wax and (B) an effective amount to cause fluxing, at or below the soldering temperature of the piece to be soldered, of a wax-soluble diester of sulfomaleic acid. A process for soldering electrical components to a printed circuit board comprises (A) applying a molten wax-flux composition as described above to the metal pattern side of the board, (B) allowing the wax-flux composition to solidify, (C) trimming the components leads, and (D) soldering the components to the printed circuit board.

12 Claims, No Drawings

3,960,614

WAX-FLUX COMPOSITION CONTAINING A DIESTER OF SULFOMALEIC ACID FOR SOLDERING

BACKGROUND OF THE INVENTION

Field of the Invention

This invention relates to low-temperature soldering processes. This invention also relates to wax-flux compositions useful in such low-temperature soldering processes.

A commercially popular labor saving process for assembling electronic components is to install these components on a printed circuit board. After most, if not all, of the components are installed on the circuit board, the components are soldered into place by a process known as wave soldering.

One difficulty with the wave soldering process is that the components have leads which extend 1–2 inches beyond the surface of the printed circuit board. This long length requires a very high standing wave of solder. The standing wave can be forced high enough to solder these long lead components but this has disadvantages. Among them, a large amount of solder is lost in coating all these longs leads and large globs of solder form between groups of leads which extend below the board. However, by soldering the printed circuit board prior to lead trimming, the components are fixed in place and can be trimmed by mechanical means rather than being hand trimmed, although hand-trimming, of course, is quite feasible.

The disadvantage of trimming a circuit board after it has been soldered is that critical applications, such as military or space applications require the circuit boards be resoldered subsequent to the trimming. This, of course, greatly increases the expense to the party doing the soldering as well as increases the risk of damage to the components.

An alternative to soldering the long leads is to hand trim them and bend the stubs over against the board before soldering. The bent-over stubs hold the components in place during the soldering operation. Advantages of this method are that only one soldering operation is required and only a low wave of solder need be maintained. The disadvantage is the large amount of hand labor required by this method.

What is needed is an inexpensive method which does not involve solder to fix the components in place on the circuitboard while the leads are being trimmed and which does not interfere with the subsequent soldering operation.

Wave soldering also uses a flux to clean the printed circuit board and prepare both the component leads and the printed circuit board foil to receive the solder. In a typical commercial installation, a liquid flux is maintained in a bath which contains fritted aspirators. Aspirating the liquid results in a foam head on the flux tank. The amount of aspiration is controlled so that the foam head just touches the printed circuit boards conveyed above it. A light film of the liquid flux is then deposited on the printed circuit board which subsequently passes over a heater. This preheats the circuit board. The printed circuit board immediately thereafter passes over the standing wave of solder and the soldering process is accomplished.

One disadvantage of using this method of applying the soldering flux to the parts which are to be soldered is that extra equipment is needed. In addition, the flux must be aspirated very carefully and constant attention must be paid to the machinery to see that the flux head remains at the right height. If the flux head is too low, obviously the printed circuit boards will not be properly treated and a poor soldering job will result. If the flux head is too high, the entire circuit board including the components may be coated with flux which requires additional cleaning as well as wastes soldering flux. What is needed is a convenient way to apply the soldering flux to the printed circuit board which does not require special equipment and special attention.

The present invention not only solves the problem of how to firmly fix the components to the printed circuit board for the lead-trimming operation, but also the problem of how to conveniently apply soldering flux to the printed circuit board all in a single-step operation.

SUMMARY OF THE INVENTION

A wax-flux composition for use in low-temperature soldering processes is provided comprising (A) a major amount of a wax and (B) an amount effective to cause fluxing, at or below the soldering temperature of the piece to be soldered, of a wax-soluble diester of sulfomaleic acid. The hardness of the wax at room temperature is chosen to effectively hold the electronic components in place during an automatic lead-trimming operation. The diester of sulfomaleic acid provides fluxing action during the subsequent soldering step thereby obviating the need to separately apply a soldering flux.

DETAILED DESCRIPTION OF THE INVENTION

Wax-flux compositions for use in a low-temperature soldering process are provided comprising: (A) a major amount of a wax having an American Melting Point (AMP determined by ASTM D 127-60) between 40° and 100°C and (B) an amount effective to cause fluxing, at or below the soldering temperature of the piece to be soldered in said process, of a wax-soluble diester of sulfomaleic acid. In a second embodiment of the invention a process is provided for soldering electrical components to a printed circuit board, said board comprising a non-conducting substrate and a pattern of an electrically conductive metal laminated to said substrate, said metal being solderable with a low-melting-point alloy solder, said board having component lead receiving holes through both said substrate and said metal pattern, comprising:

a. applying a molten wax-flux composition described above to the metal pattern side of said board and to said component leads;

b. allowing said wax-flux composition to solidify;

c. trimming said component leads; and d. soldering said component to said printed circuit board with a low-melting-point alloy solder.

The Wax

Suitable waxes for use in the wax-flux compositions of this invention and in the soldering processes of this invention include any wax or wax blend which is solid at room temperature and has a melting point below the temperature at which the soldering process will be conducted. Preferably the waxes have an AMP of an least 40°C and generally the waxes will have an AMP not greater than 100°C. Preferably the waxes have an AMP between 50° and 80°C.

Suitable waxes include petroleum-derived waxes such as the well known paraffin waxes, microcrystalline waxes, slack waxes, scale waxes, petrolatum, etc. These waxes are obtained from the processing of crude petroleum and are generally substantially saturated, substantially straight long-chain aliphatic hydrocarbons. Petroleum waxes suitable for use in this invention have AMP's within the range specified above.

Suitable wax blends for use in this invention include the hot melt coatings which consist of blends of petroleum waxes and polymers, copolymers or resins. Suitable materials which may be blended with the petroleum waxes include polymers of low molecular weight olefins, such as polymers of ethylene, propylene, butylene, isobutylene, and the like. Suitable polymers will have molecular weights from about 1,000 to about 1,000,000, more usually from about 1,000 to about 50,000. These are average molecular weights and generally a major portion of the molecules of the polymer will have molecular weights close to the average.

Suitable copolymers include copolymers of olefins with olefinic esters such as ethylene-vinyl acetate copolymers. These copolymers are commercially available from E. I. DuPont DeNemours & Company under the trade name ELVAX. Other suitable copolymers include copolyers of different olefins such as the copolymers of propene and butene. Typically such a copolymer will contain from about 15 to about 85 mol percent propene, more usually from about 25 to 75 mol percent propene. Typical copolymer molecular weights will range from about 1,000 to about 1,000,000, more usually from about 1,000 to about 300,000.

Other suitable wax blends include wax compositions incorporating cellulose esters or cellulose ethers. Suitable cellulose esters include alkyl esters of cellulose wherein the cellulose molecule contains, on the average, 3 alkyl radicals per glucose unit, i.e., the cellulose esters are triesters of cellulose. Typically, the alkyl radicals contain from about 7 to about 16 carbon atoms which include cellulose triheptanoate, cellulose trioctanoate, cellulose tridecanoate, cellulose trilaurate, etc.

Suitable cellulose ethers include the di- and triethers of cellulose wherein the ether radicals are hydrocarbon radicals, preferably alkyl radicals each having from 1 to 18 carbon atoms, with the combined total number of carbon atoms preferably being at least 12. In other words, although each of the hydrocarbon ether radicals on each glucose unit of the cellulose has from 1 to 18 carbon atoms, the total number of carbon atoms preferably is at least 12. In the case of diethers, one of the ether radicals preferably contains at least 8 carbon atoms. Suitable ethers of cellulose include cellulose methyl octyl ether, cellulose ethyl octyl ether, cellulose ethyl decyl ether, cellulose ethyl dodecyl ether, cellulose ethyl tetradecyl ether, cellulose propyl octyl ether, cellulose butyl octyl decyl ether, cellulose methyl butyl amyl ether, cellulose tri(butyl) ether, cellulose methyl octyl octadecyl ether, etc.

Typically the cellulose, prior to etherification or esterification, has a molecular weight ranging from about 40,000 to about 500,000. Typically the cellulose esters and cellulose ethers are used in the wax compositions in amounts ranging from about 2 to about 30 percent, preferably from about 10 to about 20 percent by weight.

Suitable waxes for this invention also include waxes obtained from natural sources, such as animal, vegetable or insect sources. Suitable waxes include beeswax, carnuba wax, montan wax, wool wax, and the like.

Another type of wax suitable for use in this invention includes the well known Fischer-Tropsch waxes. Fischer-Tropsch waxes are waxes synthesized by the familiar Fischer-Tropsch process. By this process, coal is burned in the presence of oxygen and steam to produce hydrogen and carbon monoxide, which are then reacted in the presence of catalyst to make the desired hydrocarbon wax. Suitable Fischer-Tropsch waxes for this invention can be obtained under the trade name "Paraflint". These particular Fischer-Tropsch waxes have a high molecular weight, on the average in the range of about 750 to 1000 and generally consist essentially of straight-chained hydrocarbons.

Although the above waxes have been mentioned individually suitable waxes for this invention include mixtures of various proportions of the above-mentioned waxes.

The Fluxing Agent

The wax-flux compositions provided by this invention and useful in the process of this invention include a waxsoluble diester of sulfomaleic acid. Suitable waxsolublizing esterifying substituents contain from about 1 to about 22 carbon atoms such that the total number of carbon atoms contained in the ester substituents is at least 12 and up to about 30 carbon atoms.

Preferably the diesters of sulfomaleic acid useful in this invention have the following general formula:

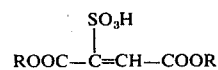

wherein each R independently represents a wax-solublizing group such as alkyl containing 1-22 carbon atoms, such as methyl, ethyl, propyl, butyl, isobutyl, tert-butyl, pentyl, hexyl, 2-methylhexyl, octyl, 2-ethylhexyl, tripropenyl, decyl, dodecyl, tetrapropylenyl, tridecyl, tetradecyl, pentadecyl, pentapropylenyl, hexadecyl,, octadecyl, hexapropylenyl, eicosyl, docosyl, and the like such that the total number of carbon atoms contained in all of said R groups is from 12 to about 30 carbon atoms. Preferably each R independently represents an alkyl containing 4 to 22 carbon atoms and more preferably 8 to 22 carbon atoms. For ease of manufacture, the R groups preferably are all the same alkyl group.

The diester having a free (i.e., not in salt form) sulfonic acid group may be prepared directly. The acids are prepared by esterification of sulfomaleic anhydride with a suitable alcohol or mixture of alcohols. Examples of suitable alcohols include the alcohol form of the alkyl radicals mentioned above for the value of R.

Esterification is easily accomplished by heating a quantity of at least two mols (preferably a slight excess) of the appropriate alcohol with one mol of sulfomaleic anhydride or acid for a period of ten minutes to one hour at temperatures in the range of 50° to 150°C.

The sulfomaleic anhydride starting material may be produced conventionally by reacting maleic anhydride with a slight molar excess of sulfur trioxide, heating for 1–2 hours at 80°–125°C. The excess sulfur trioxide may be stripped off and recovered from the mixture.

The Wax-Flux Compositions

The wax-flux compositions of this invention are prepared by melting the wax or wax blend and dissolving the diester therein. The mixture is then stirred until homogeneity is obtained. The wax-flux composition is cast into blocks or slabs and allowed to solidify unless it is to be immediately used.

The wax-flux compositions of this invention will contain an amount effective to cause fluxing, at or below the soldering temperature of the piece to be soldered, of the wax-soluble diester. This effective amount can readily be determined by those skilled in the art by a few simple soldering tests to determine the minimum amount necessary. Any amount above the minimum necessary to cause effective fluxing generally is not necessary and increases the cost of the wax-flux composition without additional benefits during the soldering process. Typically, the wax-flux compositions will contain from about 1 to about 20 weight percent of the diester, more usually from about 3 to about 12 weight percent and preferably from about 5 to about 10 weight percent.

The Process

The wax-flux compositions of this invention are useful in the soldering process of this invention. The soldering process for this invention provides a method for soldering electrical components to a printed circuit board. Printed circuit boards are well known in the art. They consist of a non-conducting substrate and a pattern of an electrically conductive metal laminated to the substrate. Typically, the substrate is a phenolic resin or an epoxy fiberglass composition board. Almost universally the electrically conductive metal is a copper foil. The pattern of the conductive metal on the substrate can be prepared by a number of means well known to those skilled in the art.

The printed circuit board has lead receiving holes. The electrical component leads are inserted through the holes from the non-pattern side of the board. Typically, the electrical components have leads which extend 1 to 2 inches beyond the pattern side of the board. In some prior art methods of soldering the components to the board, the leads are soldered to the metal pattern and then the lead is trimmed relatively close to the board.

The process of this invention is particularly applicable to automated soldering with wave soldering machines. Wave soldering machines are commercially available from a number of sources and are used by most of the electronics industry manufacturers. As mentioned above, a particularly troublesome problem in trying to solder electronic components to printed circuit boards with wave soldering machines is the long leads of the electronic components which extend beyond the board.

In the process of this invention, the component leads are inserted through the holes of the printed circuit board. Then without trimming the leads, the molten wax-flux composition is applied to the metal pattern side of the circuit board and allowed to solidify. Once the wax-flux composition has solidified, the components are firmly attached to the board and the component leads can be trimmed prior to the soldering operation.

The component leads of the waxed board can be trimmed by any available method including hand-trimming and automated trimming. A most convenient method of trimming uses a high-speed circular metal-cutting saw. One example of such a saw is a 16-inch high-speed circular saw sold by Hollis Engineering Company of Nasha, New Hampshire under the name Holli-Cutter. To use the Holli-Cutter, the printed circuit board is placed on a conveyer which passes over the circular saw. The space between the printed circuit board and the saw blade is adjusted to give trimmed leads of the desired length.

After the leads are trimmed, the electrical components are soldered to the printed circuit board with a low-melting-point alloy solder. This soldering operation can be conducted by any of the conventionally available means such as by hand-soldering or by automated wave soldering.

In a preferred embodiment of the process, the wax-flux composition is applied to the printed circuit board by contacting the metal pattern side of the board with the crest of a standing wave of molten wax-flux composition. Thereafter the wax-flux composition is allowed to solidify, generally with the aid of a forced draft of cold air. The component leads are then trimmed by an automated cutting means which is placed in line with the conveyer carrying the printed circuit board. Thereafter the components are soldered to the board by contacting the metal pattern side of the board with the crest of a standing wave of the low-melting-point alloy solder, typically, in one of the commercially available automated wave soldering machines.

When a wave soldering machine is used, it is often found advantageous to maintain a thin film of tinning oil over the surface of the standing pool of molten solder in the catch basin of the wave soldering machine. The tinning oil helps reduce oxidation and dross formation of the molten solder which can lead to poor soldering. Suitable tinning oils are available commercially. One such tinning oil is available from Hollis Engineering Company and comprises a bright stock containing fats, fatty acids, naturally occurring unsaturated long-chain acids, and oxidation inhibitors. Typically, the tinning oil is changed approximately every 8 hours. In the process of this invention, the tinning oil becomes contaminated with the wax-flux composition which melts and is removed from the printed circuit board during the soldering operation. It has been found such a small quantity of wax-flux composition is coated onto each board, that even with a very high soldering rate, the wax-flux composition contamination of the tinning oil does not cause a significant reduction in the useful life of the oil. This slight increase in the frequency of changing the tinning oil is a very small price to pay for the convenience and improved soldering offered by the process of this invention.

Subsequent to the soldering process, any remaining traces of the flux are generally removed from the printed circuit board. This prevents potential long-term corrosion of the printed circuit board and the component leads.

The flux and tinning oil can be removed either by vapor degreasing or aqueous washing. Machines are available commercially for practicing both methods. For aqueous washing, these generally resemble large dishwashers. Typically, the wash water is maintained between 60°C and 72°C. Generally a detergent is used during the washing process. Typical detergents are mixtures of alkaline surface-active agents and nonionic surface active agents. Suitable commerically available detergents include Aqua-Clean available from Hollis Engineering Company and Lonco-Terge available from Lonco Corporation.

As a final step of the washing process the circuit boards are rinsed with warm or hot deionized or distilled water to remove the last traces of the fluxing agent and the detergents.

The following examples illustrate the preparation of diesters useful in the wax-flux compositions of the invention. The examples are illustrative and non-limiting.

EXAMPLES

EXAMPLE 1

Sulfonation of Maleic Anhydride 8.90 g. of maleic anhydride was melted in a 60°C-bath and 9.76 g of $SO_3$ was added dropwise for a one-hour period with stirring. Then the reaction mixture was stirred and heated in a 100°C-bath for 30 minutes. Nuclear Magnetic Resonance (NMR) showed 94 mol% conversion to sulfomaleic anhydride and sulfofumaric acid (95/5). The stirred and heated liquid was swept with dry air until all fuming stopped, giving the theoretical weight of 16.2 g (corrected for NMR sample). NMR analysis showed 97 mol% (98.3 weight percent) sulfomaleic anhydride and sulfofumaric acid (93/7).

EXAMPLE 2

Esterification of Sulfomaleic Anhydride With Various Alkanols and Their Mixtures 5.6 mmols of sulfomaleic anhydride was heated in a small vial with 11.7 mmols of 1-octanol (mol ratio of 1-octanol to sulfomaleic anhydride = 2.10/1) in a 100°C bath until the contents melted. Stirring and heating were continued for 5 minutes, yielding a homogeneous viscous fluid. Acidity was determined by titrating with standard base in 10% acetone-in-water solvent. Active sulfonic acid was determined by titration with standard quaternary ammonium solution ["Analysis of Synthetic Anionic Detergent Compositions" R. House and J. L. Darragh, Anal. Chem. 26, 1492 (1954)]. Analyses on samples made by procedures similar to the above are:

| Sample From | Active Yield, mol % | Acid Loss, meq./meq. of active |
| --- | --- | --- |
| A - 1-hexanol | 56* | — |
| B - 1-heptanol | 88 | 1.90 |
| C - 1-octanol | 86 | 1.91 |
| D - 1-nonanol | 90 | 1.93 |
| E - 1-decanol | 88 | 1.94 |
| F - 1-undecanol | 88 | 1.98 |
| G - 2-ethylhexanol | 84 | 1.98 |
| H - 50/50 1-heptanol & 1-octanol | 89 | 1.82 |
| I - 50/50 1-octanol & 1-nonanol | 89 | 1.85 |

*Quaternary titration probably gave low result due to improper hydrophobe-hydrophile balance The following examples are included to further illustrate the invention. The examples are illustrative and non-limiting.

Wax-flux compositions of this invention are tested in commercially available wave soldering equipment. The results of these tests are compared against soldering operations conducted in commercially available wave soldering equipment using a commercially available wave soldering flux, namely Alpha Reliafoam 809 Flux available from Alpha Metals, Inc., 56 Water Street, Jersey City, N.J. 07304. This flux is one of the most widely used commercially available liquid fluxes for wave soldering. It has been found to have the capacity to satisfactorily flux copper printed circuit boards having visible dirt, tarnish and corrosion.

For soldering sample printed circuit boards using the commercially available Alpha flux, the wave soldering equipment comprises an in-line unit having a foam flux applicator, a preheater, and a wave solder applicator. The in-line unit includes a conveyer which transports the boards through the various steps of the soldering operation. Printed circuit boards for the soldering operation are prepared by inserting the leads of electronic components through the holes in the printed circuit board, trimming the leads, and bending the stubs over against the copper foil. The printed circuit boards used in these tests are deliberately prepared to be dirty, tarnished and difficult to solder.

For soldering printed circuit boards using the wax-flux composition of this invention the wave soldering equipment includes a wax-flux applicator in which the molten wax-flux composition at about 75°–95°C is pumped into a standing wave about 4–5 cm in height. Next in line is a lead trimmer which is, in this case, a Holli-Cutter available from Hollis Engineering, Inc. The Holli-Cutter comprises a 16-inch highspeed tungsten carbide-tipped circular saw. After the lead trimmer is the board preheater and then the wave solder applicator. The leads of electronic components are inserted through the holes in the printed circuit board. The leads are left untrimmed. The board with the electronic components is placed on the conveyer of the soldering apparatus. The printed circuit board is conveyed first over the wax-flux wave. A thin film of wax-flux remains on the underside of the printed circuit board. The board then passes over a forced draft of cool air which cools and solidifies the wax. The board then passes over the lead trimmer and the electronic component leads are trimmed to the desired length. The board then passes over the flux preheater and over the wave of solder. The printed circuit boards soldered with the wax-flux composition of this invention and according to the process of this invention are then compared with the printed circuit boards soldered using the commercially available liquid flux.

EXAMPLE 3

The wax-flux composition comprises 90% weight refined base wax having an AMP of 154/156 and 10% of a didodecyl ester of sulfomaleic acid. The wax-flux composition securely attaches the electronic components to the printed circuit board and allows fully satisfactory automated lead trimming. During the soldering step this wax-flux composition provides fluxing and allows soldering comparable to the commercially available soldering flux. A certain amount of dewetting is noted when the soldering wave contains no tinning oil.

Subsequent to the soldering step the printed circuit board is washed in a circuit board washer using a 71°C aqueous detergent solution containing Hollis Aqua-Clean. The washed boards are completely clean and free of any wax or oil residue.

EXAMPLE 4

A wax-flux composition comprising 90% weight refined base wax having an AMP of 154/156 and 10% weight of a diundecyl ester of sulfomaleic acid when tested in the wave soldering apparatus is found to yield results similar to those obtained in Example 3.

EXAMPLE 5

A wax-flux composition comprising 90% weight refined base wax having an AMP of 154/156 and 10% weight of a dioctyl ester of sulfomaleic acid when tested in the wave soldering apparatus is found to yield results similar to those obtained in Example 3. However, the dioctyl ester is found to be not completely soluble in the wax at the 10% weight concentration.

What is claimed is:

1. A wax-flux composition for use in a low-temperature soldering process, comprising:
   A. a major amount of a wax having an average melting point between 40°C and 100°C, and
   B. an amount effective to cause fluxing, at or below the soldering temperature, of the piece to be soldered in said process of a wax-soluble dialkyl ester of sulfomaleic acid.

2. A wax-flux composition of claim 1 wherein said wax-soluble ester has the following formula:

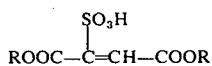

wherein each R independently contains from 1 to 22 carbon atoms such that the sum of the carbon atoms contained in both R groups is at least 12.

3. A wax-soluble composition of claim 2 wherein said R groups contain from 4 to 22 carbon atoms.

4. A wax-flux composition of claim 2 wherein said R groups contain from 8 to 22 carbon atoms.

5. A wax-flux composition of claim 4 wherein said ester comprises 1 to 20 weight percent of said composition.

6. A wax-flux composition of claim 4 wherein said ester comprises 3 to 12 weight percent of said composition.

7. A wax-flux composition of claim 5 wherein R represents octyl and said wax has an average melting point of from 50° to 75°C.

8. A wax-flux composition of claim 5 wherein R represents undecyl and said wax has an average melting point of from 50° to 75°C.

9. A wax-flux composition of claim 5 wherein R represents dodecyl and said wax has an average melting point of from 50° to 75°C.

10. A process for soldering an electrical component to a printed circuit board, said board comprising a non-conducting substrate and a pattern of an electrically conductive metal laminated to said substrate, said metal being solderable with a low-melting-point alloy solder, said board having component lead receiving holes through both said substrate and said metal pattern, said component having electrical leads, and said component being mounted on said board by having at least one of said leads inserted through a said lead receiving hole, said process comprising:
   a. applying a molten wax-flux composition of claim 1 to the metal pattern side of said board and to said component lead;
   b. allowing said wax-flux composition to solidify;
   c. trimming said component lead; and
   d. soldering said component to said printed circuit board with a low-melting-point alloy solder.

11. The process of claim 10 wherein:
   a. said wax-flux composition is applied to said board by contacting the metal pattern side of said board with the crest of a standing wave of said molten wax-flux composition; and
   b. said component is soldered to said board by contacting the metal pattern side of said board with the crest of a standing wave of said low-melting-point alloy solder.

12. The process of claim 11 wherein said component lead is trimmed by a circular saw.

* * * * *